United States Patent
Liu et al.

(10) Patent No.: US 10,581,118 B2
(45) Date of Patent: Mar. 3, 2020

(54) CO-SOLVENTS WITH HIGH COULOMBIC EFFICIENCY IN PROPYLENE CARBONATE BASED ELECTROLYTES

(71) Applicants: Gao Liu, Piedmont, CA (US); Hui Zhao, Emeryville, CA (US); Sang-Jae Park, Walnut Creek, CA (US)

(72) Inventors: Gao Liu, Piedmont, CA (US); Hui Zhao, Emeryville, CA (US); Sang-Jae Park, Walnut Creek, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/632,153

(22) Filed: Jun. 23, 2017

(65) Prior Publication Data

US 2017/0294683 A1 Oct. 12, 2017

Related U.S. Application Data

(62) Division of application No. 14/506,158, filed on Oct. 3, 2014, now Pat. No. 9,692,086.

(60) Provisional application No. 61/886,527, filed on Oct. 3, 2013.

(51) Int. Cl.
| | |
|---|---|
| *H01M 10/0568* | (2010.01) |
| *H01M 10/0569* | (2010.01) |
| *H01M 10/0525* | (2010.01) |
| *H01M 4/38* | (2006.01) |
| *H01M 4/58* | (2010.01) |
| *H01M 4/587* | (2010.01) |
| *H01M 10/052* | (2010.01) |

(52) U.S. Cl.
CPC ....... *H01M 10/0569* (2013.01); *H01M 4/382* (2013.01); *H01M 4/386* (2013.01); *H01M 4/587* (2013.01); *H01M 4/5825* (2013.01); *H01M 10/052* (2013.01); *H01M 10/0525* (2013.01); *H01M 10/0568* (2013.01); *H01M 2220/20* (2013.01); *H01M 2300/0037* (2013.01); *Y02E 60/122* (2013.01); *Y02T 10/7011* (2013.01)

(58) Field of Classification Search
CPC ...... H01M 4/382; H01M 4/386; H01M 4/587; H01M 10/052; H01M 10/0525; H01M 10/0569; H01M 2220/20; H01M 2300/0037; Y02T 10/7011; Y02E 60/122
See application file for complete search history.

(56) References Cited

U.S. PATENT DOCUMENTS

| | | | | |
|---|---|---|---|---|
| 5,712,059 | A * | 1/1998 | Barker | H01M 4/485 429/217 |
| 6,077,627 | A | 6/2000 | Bauerlein | |
| 6,306,546 | B1 | 10/2001 | LaFleur | |
| 6,475,680 | B1 | 11/2002 | Arai | |
| 2010/0018034 | A1 * | 1/2010 | Miyasaka | H01M 4/505 29/623.1 |
| 2010/0273066 | A1 * | 10/2010 | Flanagan | H01M 4/90 429/338 |
| 2012/0088136 | A1 * | 4/2012 | Kogetsu | H01M 2/26 429/94 |
| 2013/0216903 | A1 * | 8/2013 | Pitteloud | C01G 31/00 429/211 |

FOREIGN PATENT DOCUMENTS

JP 3157152 B2 * 4/2001 ........... Y02E 60/122

* cited by examiner

*Primary Examiner* — Muhammad S Siddiquee
(74) *Attorney, Agent, or Firm* — Robin C. Chiang; Lawrence Berkeley National Laboratory

(57) ABSTRACT

A homologous series of cyclic carbonate or propylene carbonate (PC) analog solvents with increasing length of linear alkyl substitutes were synthesized and used as co-solvents with PC for graphite based lithium ion half cells. A graphite anode reaches a capacity around 310 mAh/g in PC and its analog co-solvents with 99.95% Coulombic efficiency. Cyclic carbonate co-solvents with longer alkyl chains are able to prevent exfoliation of graphite when used as co-solvents with PC. The cyclic carbonate co-solvents of PC compete for solvation of Li ion with PC solvent, delaying PC co-intercalation. Reduction products of PC on graphite surfaces via single-electron path form a stable Solid Electrolyte Interphase (SEI), which allows the reversible cycling of graphite.

12 Claims, 16 Drawing Sheets

CO-SOLVENTS WITH HIGH COULOMBIC EFFICIENCY IN PROPYLENE CARBONATE BASED ELECTROLYTES

CROSS REFERENCE TO RELATED APPLICATIONS

This divisional application claims priority to U.S. application Ser. No. 14/506,158 filed Oct. 3, 2014, which in turn claims priority to U.S. Provisional Application Ser. No. 61/886,527 filed Oct. 3, 2013, which application is incorporated herein by reference as if fully set forth in their entirety.

STATEMENT OF GOVERNMENTAL SUPPORT

The invention described and claimed herein was made in part utilizing funds supplied by the U.S. Department of Energy under Contract No. DE-AC02-05CH11231 between the U.S. Department of Energy and the Regents of the University of California for the management and operation of the Lawrence Berkeley National Laboratory. The government has certain rights in this invention.

BACKGROUND OF THE INVENTION

Field of the Invention

The present invention relates to the field of Lithium ion batteries.

Related Art

As an important candidate for electric vehicle (EV) and hybrid electric vehicle (HEV) power sources, lithium-ion batteries based on graphite anodes and ethylene carbonate (EC) containing electrolytes have gained wide application. Conventional organic solvents comprise ethylene carbonate (EC), diethyl carbonate (DEC) and dimethyl carbonate (DMC). Ethylene carbonate (EC) forms a stable solid electrolyte interphase (SEI) at ~0.8 V before lithium intercalation. Being $Li^+$ permeable and electronic non-conductive, the SEI prevents further electrolyte decomposition and allows reversible lithiation and delithiation of graphite anodes. The major disadvantage of EC is its high melting point at around 34° C., since EC is a solid material at room temperature EC needs other co-solvents such as dimethyl carbonate (DMC) and diethyl carbonate (DEC). The relatively high melting point of EC also limits the use of lithium-ion batteries at low temperatures. Propylene carbonate (PC) has a wide liquid temperature range (−48.8~242.0° C.) and very good low temperature performance compared to EC. However, with only a negligible structural difference from EC, PC undergoes a detrimental solvent decomposition on the surface of graphite with high crystallinity. This causes disintegration of the graphite electrode, usually accompanied with delamination of the active material from a current collector and ultimately cell failure.

Two different physical pictures are commonly used to explain the detrimental effect of PC in a graphite lithium-ion battery. In the first scenario originally proposed by Peled and developed by Aurbach, a decomposition voltage of the cyclic carbonates is at approximately 0.8~1.0 V higher than a lithium intercalation voltage 0.01~0.25 V. In the case of an EC cyclic carbonate, the decomposition products form a surface film (SEI), which is compact and protective to prevent further solvent co-intercalation into graphene layers. However, in the case of an PC cyclic carbonate, a surface film formed by PC is not so effective, wherein repeated solvent co-intercalation occurs and the resulting decomposition products cause deterioration of the graphite capacity and reversibility. Besenhard and Winter proposed the formation of solvated graphite-intercalation compounds (GICs)-$Li(solv)_yC_n$. Co-intercalation of GICs and the subsequent decomposition products determine the cell behavior.

Based on Besenhard and Winter's solvent co-intercalation theory, the model in FIG. 1 is used to explain exfoliation of graphite in PC. Black dot represents $Li^+$, the circles represent PC and hexylene carbonate (HeC) solvents. This model assumes a solvation number of 2 for the ease of illustration, although a more realistic value is about 3 or 4. When using pure PC as solvent as presented in FIG. 1, solvated $Li^+$ tend to drag PC molecules into graphene layers in the process of intercalation. There are a lot of electrons in the graphite in the discharge (lithiation) process, which cause a two-electron reduction of PC. As shown in FIG. 1, each PC molecule consumes two electrons and decomposes to lithium carbonate and propene. The propene gas induces micro-cracks inside the graphite layers/particles which leads to a disintegration of the graphite electrode. GICs are stable enough to be detected by X-ray measurement. Yamada showed that PC exfoliation is prevented by changing PC/DMC ratio from 1/1 to 1/7, wherein a smaller ratio of PC molecules in the $Li^+$ solvation sheath contributes to this behavior. Cresce et al. recently used mass spectroscopy with a soft ionization technique electrospray ionization to study the $Li^+$ solvation structure, which revealed a close connection between the SEI component and $Li^+$ solvation structure. Chung et al. modified different parameters that could influence the solvent decomposition behavior in graphite half cell, the overall results show that solvent co-intercalation is critical to explain the cell behaviors.

BRIEF DESCRIPTION OF THE DRAWINGS

The foregoing aspects and others will be readily appreciated by the skilled artisan from the following description of illustrative embodiments when read in conjunction with the accompanying drawings.

OcC/PC=2 and (e) (f) DoC/PC=1 (v/v) at C/10 rate for 10 cycles. The scale bar is 10 μm in (a), (c) and (e), 1 μm in (b), (d) and (f).

Figure 9:
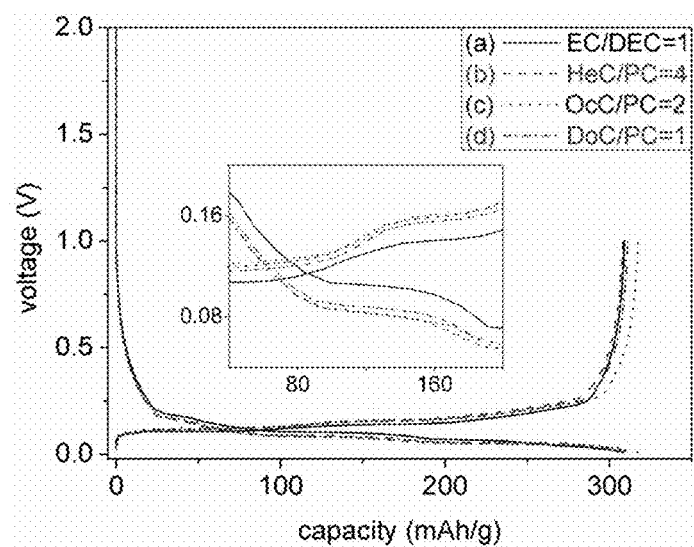

FIG. 9 illustrates the potential profiles of graphite anodes at $10^{th}$ cycle cycled in 1 M LiPF$_6$ solution of (a) EC/DEC=1, (b) HeC/PC=4, (c) OcC/PC=2 and (c) DoC/PC=1 (v/v) at C/10 rate.

Figure 10:
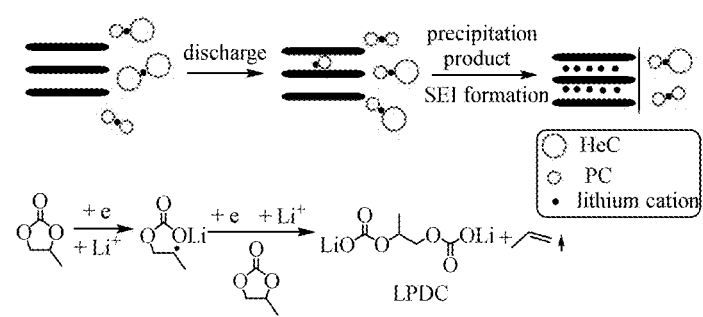

FIG. 10 illustrates a proposed single-electron reduction path of PC when co-interlcation is delayed by HeC, assuming a solvation number of 2.

Figure 11:
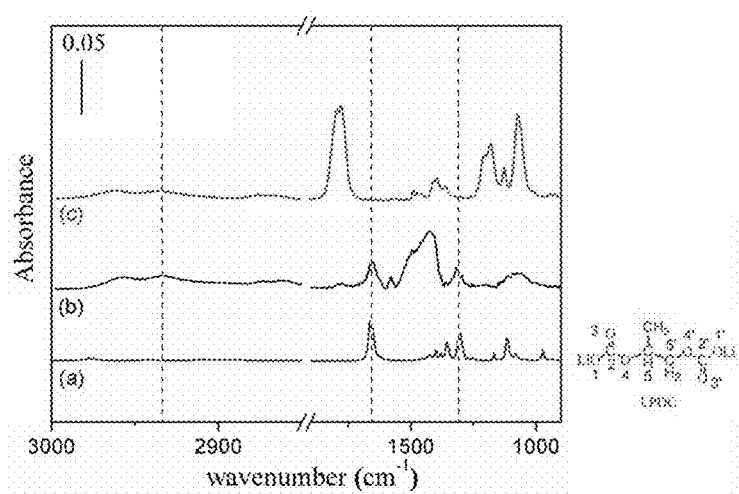

FIG. 11 illustrates the FTIR spectra of (a) standard LPDC, (b) graphite electrode cycled in 1 M LiPF$_6$ solution of HeC/PC=4 for around 10 cycles at C/10 and (c) 1 M LiPF$_6$ in HeC/PC=4.

Figure 12:
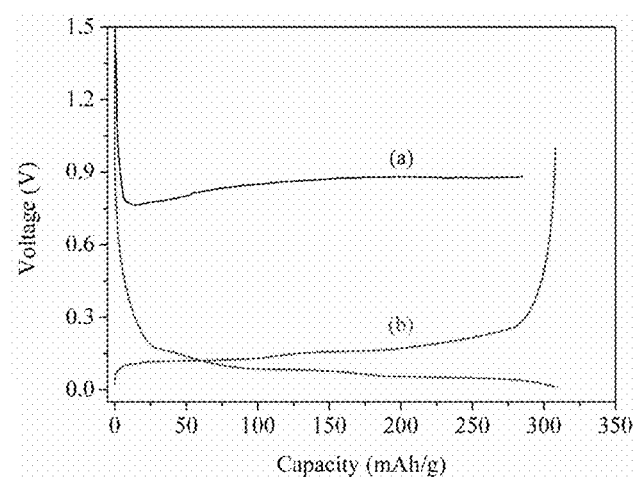

FIG. 12 illustrates (a) The voltage profile at C/100 and (b) $1^{st}$ cycle voltage curve at C/10 in 1 M LiPF$_6$ solution of HeC/PC=4 in graphite based half cell.

Figure 13:
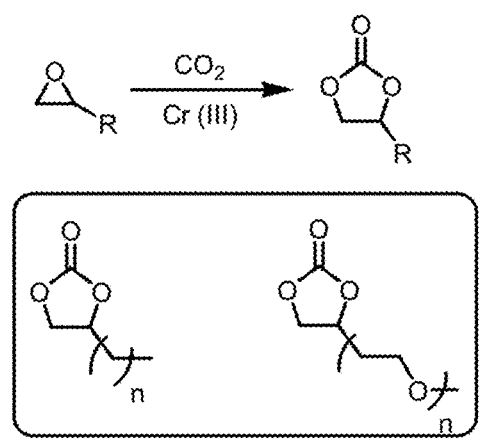

FIG. 13 illustrates an ethylene carbonate-based additives and suggested synthetic route.

Figure 14:
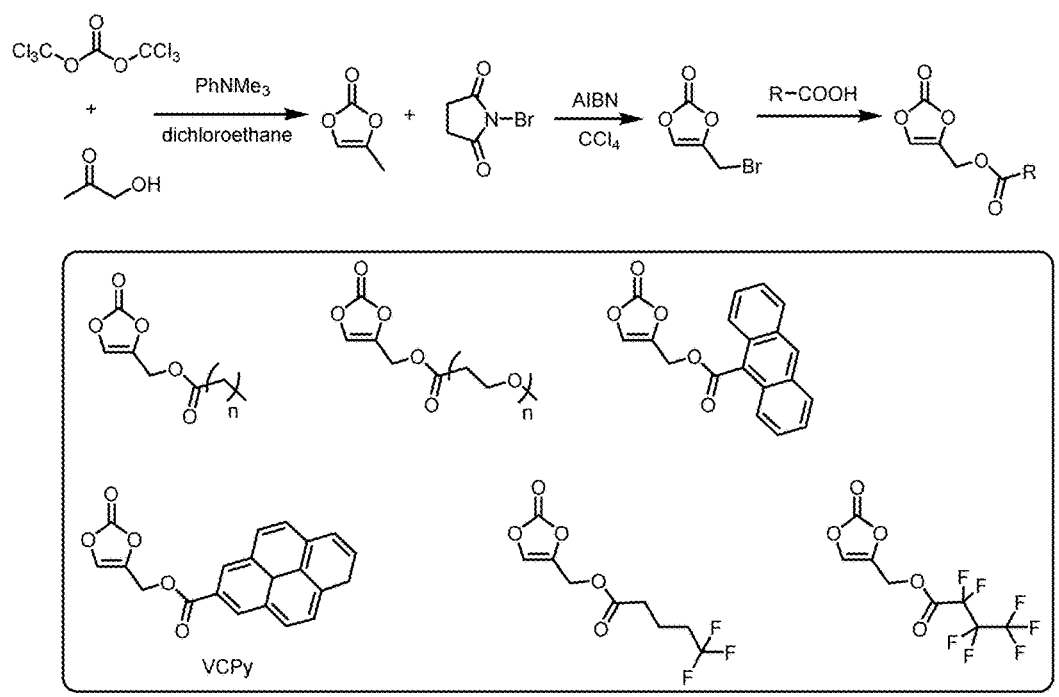

FIG. 14 illustrates a vinylene carbonate (VC)-based additives and suggested synthetic route.

Figure 15:
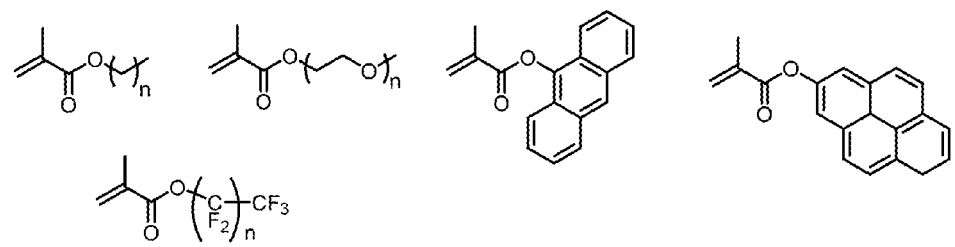
Figure 15:
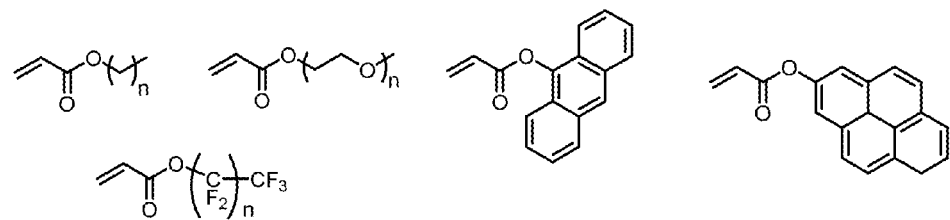

FIG. 15 illustrates methacrylate-based (top) and acrylate-based (bottom) additives.

Figure 16:
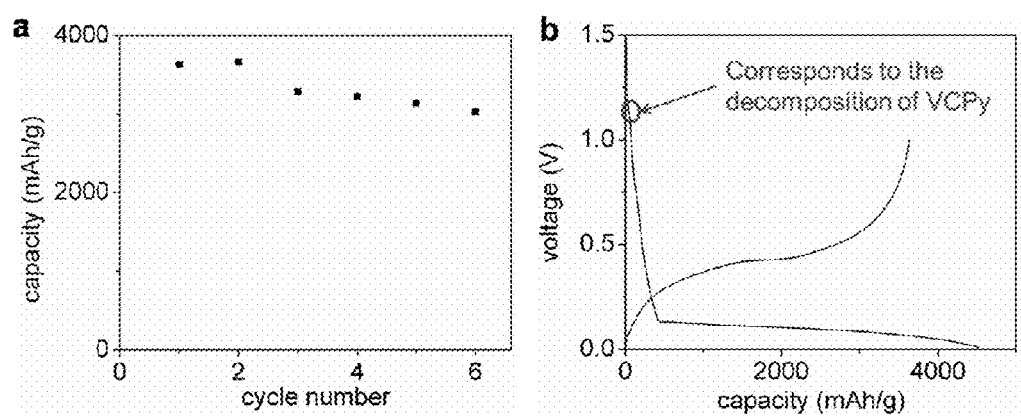

FIG. 16 illustrates the cycling performance of the silicon electrode using ethylene carbonate, diethyl carbonate with 1% vinylene carbonate pyrene (VCPy). (a) capacity vs. cycle number, the cell was cycled at C/50 for 2 cycles and then C/10. (b) a first cycle voltage profile.

DETAILED DESCRIPTION

In the discussions that follow, various process steps may or may not be described using certain types of manufacturing equipment, along with certain process parameters. It is to be appreciated that other types of equipment can be used, with different process parameters employed, and that some of the steps may be performed in other manufacturing equipment without departing from the scope of this invention. Furthermore, different process parameters or manufacturing equipment could be substituted for those described herein without departing from the scope of the invention.

These and other details and advantages of the present invention will become more fully apparent from the following description taken in conjunction with the accompanying drawings.

Various embodiments of the invention disclose a new approach to understand and compensate for the origin of graphite exfoliation. The same principles apply to carbon, silicon, tin, aluminum, and other anode or cathode materials as well. In an embodiment, a homologous series of cyclic carbonates or Propylene carbonate (PC) derivatives with increasing lengths of linear alkyl substitutes were synthesized and used as co-solvents for graphite lithium-ion half cells.

Assuming the Besenhard and Winter's concept that the initial stages of electrolyte reduction on graphite proceeds through a co-intercalated state, various embodiments of the invention describe that replacing PC in the inner solvation sphere of lithium with homologous molecules having progressively longer alkyl chains has yielded two effects on the chemistry of electrolyte reduction: 1) changing the molecular weight of reduction products so that gas formation may not be observed, thus graphite exfoliation is able to be avoided with a larger molecular weight and 2) a steric hindrance to co-intercalation without excessively altering the electrochemical potential or kinetics of reduction and allowing for reduction products to form on the external surface of the graphite and thus reducing exfoliation. Various embodiments of the invention have conclusively verified both positive effects.

Experimental

All reagents were purchased from Sigma-Aldrich or TCI America and used without further purification. Battery grade lithium hexafluorophosphate (LiPF$_6$) lithium salt was purchased from BASF. A Celgard 3501 Separator membrane was utilized. Battery-grade acetylene black (AB) was obtained from Denka Singapore Private LtD, PVDF KF1100 binder was acquired from Kureha, Japan. Coin cells were prepared with lithium metal as counter electrode. The slurry preparation, electrode coating and cell fabrication can be found in the literature.

The cyclic carbonates were synthesized based on a literature procedure. Products were purified by vacuum distillation and dried using 4 Å molecular sieves. A Mettler Toledo DL39 Karl Fisher Coulometer was used to monitor the water content to be less than 30 ppm before used. Co-solvents with different PC volume contents were prepared in an argon filled glovebox. Bruker Biospin Advance II 500 MHz NMR spectrometer was used to collect the proton and carbon NMR spectra of the synthesized products. The NMR spectra are shown in the supporting information.

Butylene carbonate (BuC): $^1$H NMR (500 MHz, CDCl$_3$), δ 4.71 (tt, 1H), 4.52 (dd, 1H), 4.09 (dd, 1H), 1.79 (m, 2H), 1.02 (t, 3H), $^{13}$C NMR (500 MHz, CDCl$_3$), δ 155.6, 77.1, 69.1, 31.9, 14.5.

Pentylene carbonate (PeC): $^1$H NMR (500 MHz, CDCl$_3$), δ 4.71 (tt, 1H), 4.52 (dd, 1H), 4.09 (dd, 1H), 1.83 (m, 1H), 1.68 (m, 1H), 1.50 (m, 1H), 1.43 (m, 1H), 0.98 (t, 3H), $^{13}$C NMR (500 MHz, CDCl$_3$), δ 155.6, 77.3, 69.2, 36.2, 17.9, 13.2.

Hexylene carbonate (HeC): $^1$H NMR (500 MHz, CDCl$_3$), δ 4.71 (tt, 1H), 4.52 (dd, 1H), 4.09 (dd, 1H), 1.84 (m, 1H), 1.70 (m, 1H), 1.49 (tt, 2H), 1.38 (m, 2H), 0.93 (t, 3H), $^{13}$C NMR (500 MHz, CDCl$_3$), δ 155.6, 77.2, 68.8, 33.4, 26.2, 21.2, 14.2.

Octylene carbonate (OcC): $^1$H NMR (500 MHz, CDCl$_3$), δ 4.71 (tt, 1H), 4.52 (dd, 1H), 4.09 (dd, 1H), 1.83 (m, 1H), 1.70 (m, 1H), 1.48 (m, 1H), 1.38 (m, 1H), 1.36-1.22 (m, 6H), 0.92 (t, 3H), $^{13}$C NMR (500 MHz, CDCl$_3$), δ 155.6, 77.5, 69.3, 34.4, 31.8, 29.3, 25.3, 22.7, 14.1.

Dodecylene carbonate (DoC): $^1$H NMR (500 MHz, CDCl$_3$), δ 4.71 (tt, 1H), 4.52 (dd, 1H), 4.09 (dd, 1H), 1.84 (m, 1H), 1.71 (m, 1H), 1.48 (m, 1H), 1.18 (m, 1H), 1.38-1.20 (m, 14H), 0.88 (t, 3H), $^{13}$C NMR (500 MHz, CDCl$_3$), δ 155.6, 77.2, 69.2, 34.2, 31.0, 29.8, 29.6, 29.5, 24.4, 22.8, 14.6.

The ionic conductivity of the cyclic carbonates with 1 M LiPF$_6$ was measured using a sample cell constructed of stainless steel disks separated by a Teflon collar, containing sample of 0.61 cm in radius and 0.0156 cm in thickness. Electro-impedance Spectroscopy was used the measure the conductivity, on a VMP galvanostat/potentiostat (Bio-Logic). The sample cell containing electrolytes was brought to 10 mV before Impedance measurement was taken in the range from 0.05 Hz to 1 MHz.

Morphology of the electrode surface was characterized using a JSM-7500F scanning electron microscopy (SEM). Attenuated Total Reflectance (ATR) mode FTIR spectra were recorded using Thermo-nexus 670 directly on the electrodes surfaces. After cycling, graphite electrodes were washed with dimethyl carbonate (DMC) solvent to remove residual electrolyte inside the argon filled glovebox. A homemade transfer system, equipped with a gate valve and a magnetic manipulator, was used for the transfer of the highly sensitive samples from the pure argon atmosphere of the glovebox to the SEM and ATR-IR system.

Results and Discussion

Synthesis and Characterization of the Mono-Substituted Cyclic Carbonates—

Figure 1:
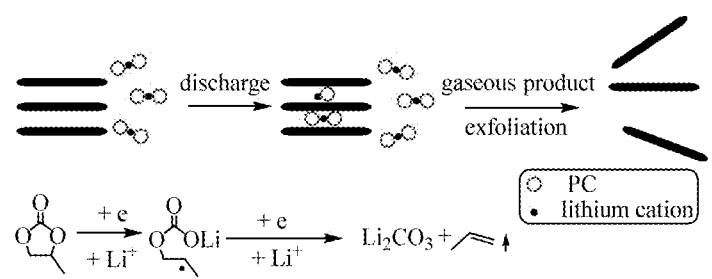
FIG. 1 illustrates a proposed two-electron reduction path of Propylene carbonate (PC) when co-interlacated into graphite in the discharge (lithiation) process, assuming a solvation number of 2.
Figure 2:
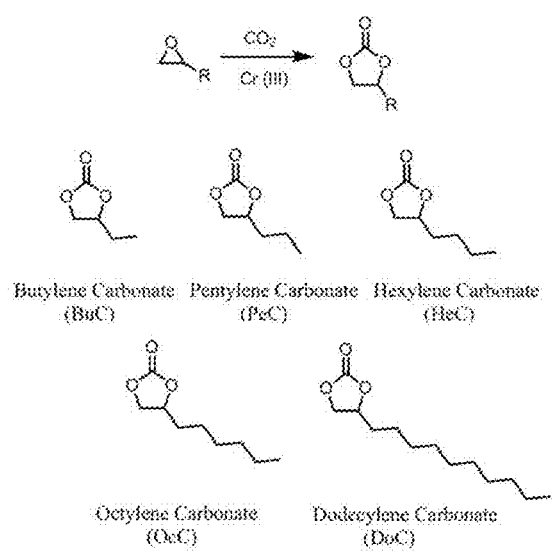
FIG. 2 illustrates a synthesis of a series of cyclic carbonate derivatives.

The mono-substituted cyclic carbonates were synthesized starting from commercial mono-substituted epoxides with different chain lengths (FIG. 2). Chromium (III) salen complexes are used to catalyze the reaction between carbon dioxide and expoxides based on a literature procedure.[12] Products with smaller substituents such as BuC, PeC and HeC are obtained with high yield (>95%). Generation of bulky cyclic carbonates such as OcC and DoC leads to an increase of the viscosity in the reaction mixture, yields are only 80% for OcC and 65% for DoC.

TABLE 1

The ionic conductivities of the electrolytes based on the synthesized cyclic carbonates.

| Cyclic carbonates | Conductivity of 1M LiPF$_6$ in different cyclic carbonate solvents at 30° C. (mS/cm) |
|---|---|
| PC | 5.1 |
| BuC | 3.1 |
| PeC | 2.3 |
| HeC | 0.5 |
| HeC/PC = 4 [a] | 2.3 |
| OcC | 0.4 |
| OcC/PC = 2 [a] | 1.9 |
| DoC [b] | X |
| DoC/PC = 1 [a] | 1.2 |

[a] volume ratio
[b] Doc is a solid material at room temperature, conductivity is not characterized.

FIG. 2 and Table 1 illustrates the melting points and lithium conductivities of the synthesized solvents. The conductivity values decrease for the electrolytes with solvents with longer alkyl chains. Solvents with longer chain length have lower dielectric constant and higher viscosity, both leading to lower conductivity.

Solvents Cause Graphite Exfoliation (BuC and PeC)—

Figure 3:
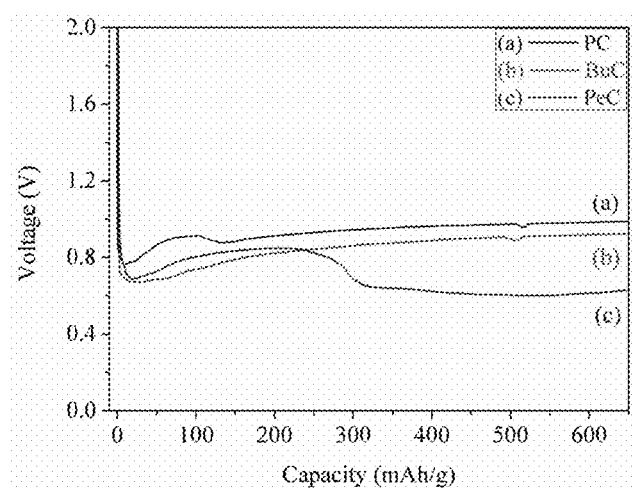
FIG. 3 illustrates a the voltage profiles of graphite based lithium ion half cells using (a) PC, (b) BuC and (c) PeC with 1 M $LiPF_6$ at C/10 rate.

CGP-C8 graphite is used to assemble lithium-ion half cell, Celgard 3501 separator is well-wetted by all the synthesized cyclic carbonates. When graphite cells cycle in BuC or PeC as solvents, the voltage curve never drops to the lithium intercalation region. Instead, there is a long plateau which corresponds to the continuous decomposition on the graphite surface (FIG. 3). This plateau occurs at 0.6 V for PeC, compared to BuC (1.0 V) and PC (1.1 V). PeC has the strongest steric hindrance of the three solvents, which needs a larger overpotential for co-intercalation.

Figure 4:
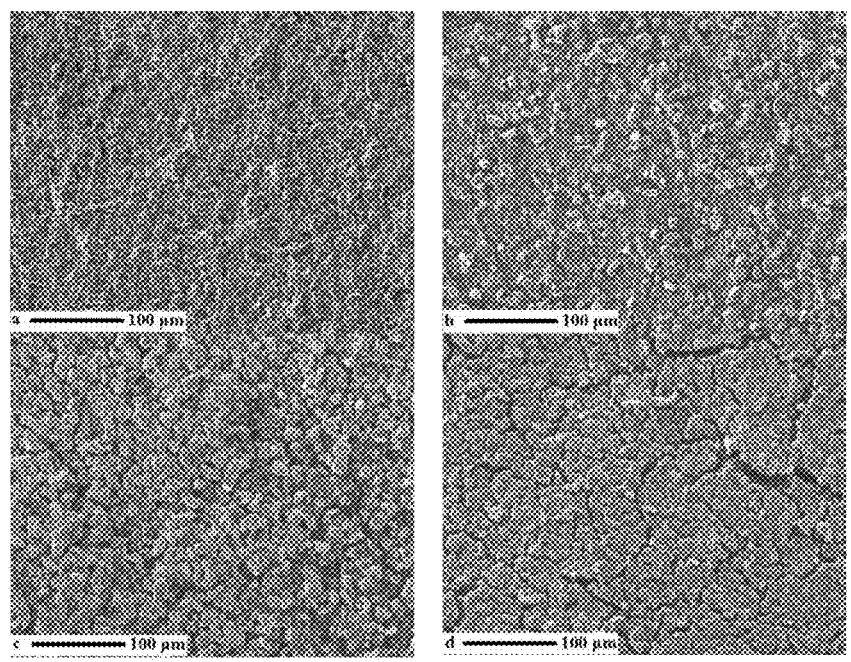
FIG. 4 illustrates a SEM images of graphite anodes after cycling in 1 M $LiPF_6$ solution of (a) EC/DEC=1, (b) PC, (c) BuC and (d) PeC at C/10. The scale bar is 100 μm.

The solvent decomposition has a destructive effect on the graphite morphology. FIG. 4 shows SEM images of graphite electrodes from the three cells, graphite morphology after cycling in EC/DEC is also shown as a comparison. The morphology in FIGS. 4(b), (c) and (d) shows that the graphite particle isolation and separation causes failure of the electrode, which is also shown by others.

The electrode cycled from EC/DEC shows that all the graphite particles are interconnected with each other. However, in the cells showing exfoliation plateau, graphite particles are electronically separated on the electrode surface. The images in FIG. 4 show that the graphite particle isolation and separation causes failure of the electrode, which is also shown by others. All three cells were cycled for about the same time (~24 h), PC causes dramatic exfoliation over the whole area of the electrode, the graphite separation by BuC and PeC is less serious.

TABLE 2

Decomposition products of substituted PC solvents from two-electron reduction mechanism.

| Solvent | Decomposition product besides Li$_2$CO$_3$ | Boiling point of the decomposition product (° C.) | Physical state of decomposition product at cell testing temperature [a] |
|---|---|---|---|
| PC | Propene | −47.6 | gas |
| BuC | 1-Butene | −6.3 | gas |
| PeC | 1-Petene | 30.0 | gas |
| HeC | 1-Hexene | 63.3 | liquid |
| OcC | 1-Octene | 121.0 | liquid |
| DoC | 1-Dodecene | 213.8 | liquid |

[a] The cells are tested at 30° C.

Physical state of the decomposition products is an important factor to determine whether graphite exfoliation occurs. Based on the proposed decomposition mechanism, Table 2 shows the decomposition products from various substituted PC solvents. Propene, 1-butene and 1-pentene are gaseous products with boiling points lower than cycling temperature (30.0° C.), which explains why PC, BuC and PeC show the exfoliation plateau when cycled in graphite half cells. 1-hexene, 1-octene and 1-dodecene are non-gaseous compounds, thus, exfoliation should not occur in the half cells in these solvents.

Bulky Solvents Prevent Graphite Exfoliation (HeC, OcC and DoC)—

HeC, OcC and DoC have longer linear alkyl substituent, graphite exfoliation does not occur in these solvents. Moreover, these bulky cyclic carbonates are able to prevent exfoliation when mixed with PC.

Figure 5:
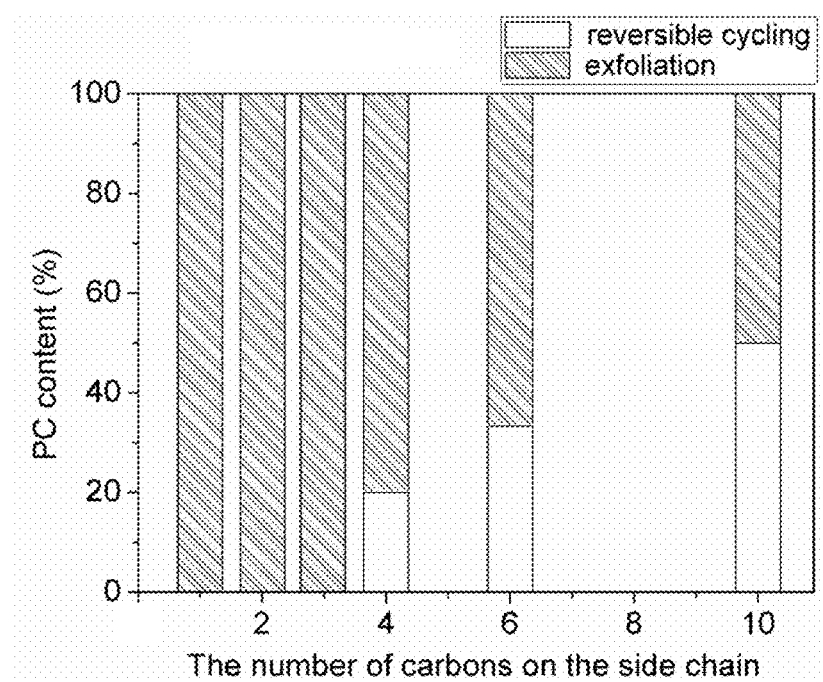
FIG. 5 illustrates the influence of steric hindrance on the ability of the synthesized cyclic carbonate to prevent PC exfoliation.

The column plot in FIG. 5 shows that maximum PC content the synthesized solvents can tolerate with the increase of carbon numbers on the side chain. With 1 carbon (PC), 2 carbons (BuC) and 3 carbons (PeC), the solvents cause exfoliation of graphite. With 4 carbons (HeC) in the side chain, HeC is able to prevent exfoliation of graphite with PC content as high as 20 vol %. Further increase of PC higher than 20 vol %, exfoliation of graphite takes over. Increase of the side chain length to 6 carbons (OcC) and 10 carbons (DoC), the transition points are 33.3 vol % and 50 vol % respectively. Solvents with a longer side chain and bigger steric hindrance could tolerate a more PC content.

Figure 6:
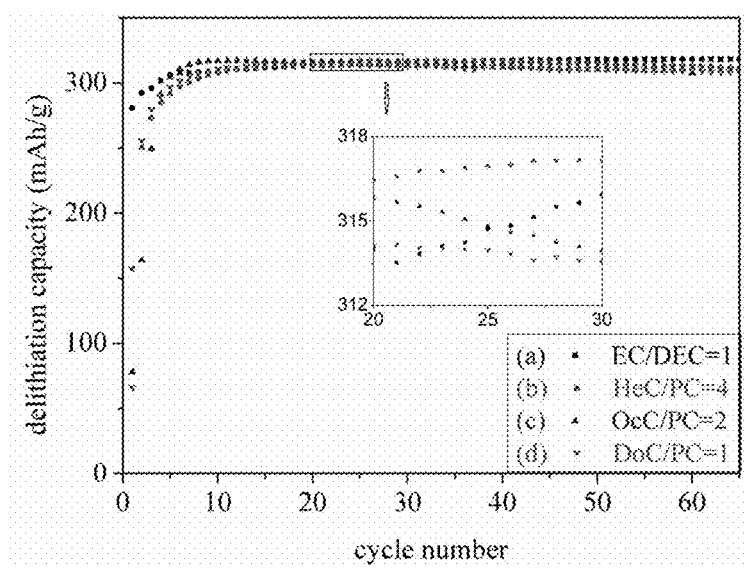
FIG. 6 illustrates the cycling performances of graphite half cell in 1 M $LiPF_6$ solution of (a) EC/DEC=1, (b) HeC/PC=4, (c) OcC/PC=2 and (d) DoC/PC=1 (v/v) at C/10 rate.

FIG. 6 shows cycling performances of graphite half cells using co-solvents of HeC/PC=4, OcC/PC=2 and DoC/PC=1 with 1 M LiPF$_6$. Cell capacities reach ~310 mAh/g in the first 10 cycles in all the three electrolytes. This indicates the formation of a stable SEI on graphite surface that prevent PC exfoliation and allows reversible cycling in graphite. Abe et al. studied co-solvent of PC with dimethyl sulfoxide, dimethoxymethane, diethoxymethane and 1,2-diethoxyethane. All these solvents are able to compete with PC co-intercalation and prevent exfoliation of the graphite. Zheng et al. observed that PC forms a stable film on graphite surface when mixed with ionic liquid as solvents in graphite half-cell. Embodiments of the invention describe that due to a similar competing effect by these synthesized cyclic carbonates, exfoliation of the graphite by PC is prevented. Moreover, the electrolytes based on these bulky cyclic carbonate/PC co-solvents form a stable SEI and graphite half cell cycle at a high capacity value with high efficiency.

Figure 7:
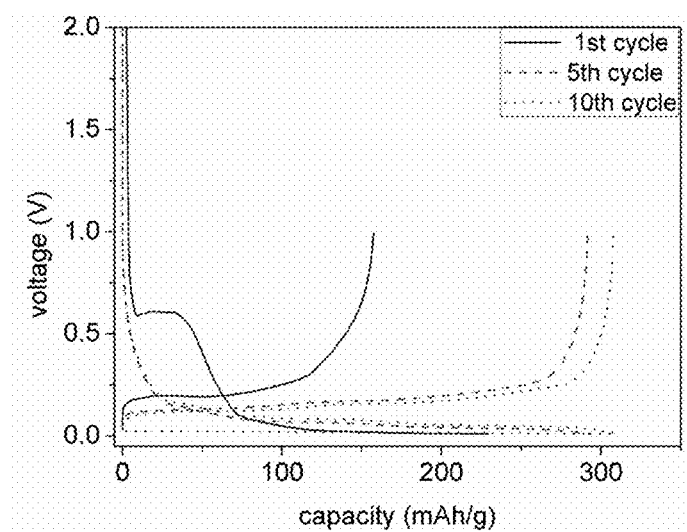
FIG. 7 illustrates the potential profiles of the $1^{st}$, $5^{th}$ and $10^{th}$ cycles for cells cycled with 1 M $LiPF_6$ in HeC/PC=4.

The voltage curves of lithium ion cell using 1 M LiPF$_6$ in HeC/PC=4 are shown in FIG. 7. There is a clear plateau in the 1$^{st}$ cycle discharge (lithiation) curve at around 0.6 V, which corresponds to the decomposition of electrolyte species, this decomposition contributed to 75 mAh/g capacity before the curve goes down to lithium intercalation voltage (~0.25 V). The capacity contributed from real lithium intercalation is only 150 mAh/g, which is a similar value to the first cycle charge (delithiation) capacity. From 1$^{st}$ cycle to 10$^{th}$ cycle there is a steady increase of cell capacity, this value is about 310 mAh/g at the 10$^{th}$ cycle.

Figure 8:
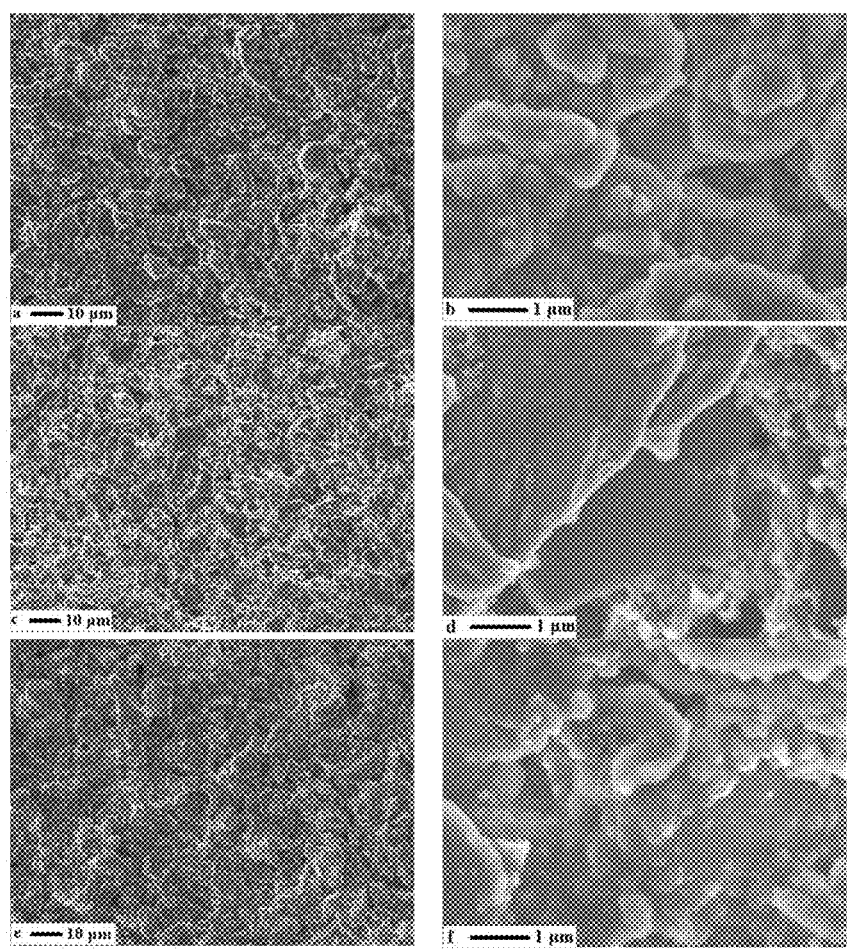
FIG. 8 illustrates SEM images of graphite anodes after cycling in 1 M $LiPF_6$ solution of (a) (b) HeC/PC=4, (c) (d)

Morphologies of graphite electrode cycled in bulky cyclic carbonates/PC co-solvents are shown in FIG. 8. CGP-G8 particles are well glued together, which is a very different morphology compared to the exfoliation electrodes shown in FIG. 4.

electrons and decompose to propene and lithium propylene dicarbonate (LPDC). LPDC is a good SEI formation component and precipitates on the graphite surface, forming a stable passivation layer, before a large amount of solvent decomposition occurs, a stable SEI is already formed to protect the graphite layer. Both single-electron and two-electron decomposition mechanisms generate propene gas, where the solvents decomposition determines whether graphite exfoliation occurs. Spahr et al. showed that when graphite surface is thermally treated to facilitate solvent co-intercalation, even EC could cause graphite exfoliation. In our case, the other decomposition product on graphite surface is a good SEI formation substance, which prevent significant solvent decomposition before a lot of gaseous products are generated.

FIG. 11 shows the FTIR spectra of graphite electrode after cycled in HeC/PC=4 electrolyte. Besides leftover electrolyte, the major component of SEI is LPDC, which is the single-electron reduction product of PC. The peak at ~1660 cm$^{-1}$ is assigned to the carbonyl group O(1)C(2)O(3) in

TABLE 3

Electrochemical data of the graphite anode in 1M LiPF$_6$ solution of different solvents at C/10.

| | | EC/DEC = 1 $^a$ | HeC/PC = 4 $^a$ | OcC/PC = 2 $^a$ | DoC/PC = 1 $^a$ |
|---|---|---|---|---|---|
| 1$^{st}$ cycle | $Q_c^b$ (mAh/g) | 307.4 | 146.5 | 78.2 | 65.9 |
| | $\eta^c$ (%) | 92.20 | 68.53 | 78.62 | 72.13 |
| 10$^{th}$ cycle | $Q_c^b$ (mAh/g) | 314.2 | 309.1 | 318.3 | 312.8 |
| | $\eta^c$ (%) | 99.75 | 99.64 | 99.68 | 99.40 |
| 40$^{th}$ cycle | $Q_c^b$ (mAh/g) | 307.9 | 315.9 | 312.7 | 312.3 |
| | $\eta^c$ (%) | 99.96 | 99.97 | 99.84 | 99.53 |

$^a$ volume ratio
$^b$ charge (delithiation) capacity
$^c$ coulombic efficiency

The electrochemical results obtained from cells with different solvents are summarized in Table 3. In all cases including EC/DEC electrolytes, there is steady increase of efficiency as well as capacities. First cycle efficiencies of graphite half cells based on bulky cyclic carbonate/PC electrolytes are in the range of 70~80%, which is lower compared to the value in EC/DEC (92%). Besides SEI formation, there must be other side reactions that contributed to the low efficiency in the bulky cyclic carbonate/PC electrolytes. Regardless of the initial performances, all these cells reach efficiencies as high as 99.95% in the 40$^{th}$ cycle, which is comparable to the cell based on EC/DEC electrolytes.

FIG. 9 shows the 10$^{th}$ cycle potential profiles of graphite half cells using different electrolytes, cell performances based on synthesized cyclic carbonates/PC mixture are quite similar to that of EC/DEC based cells. Efficiencies and capacities of each sample are shown in Table 2. The embedded figure shows that the impedance from cell cycled in EC/DEC is lowest of all 4 cells. In terms of the three cells with mono-substituted cyclic carbonate/PC co-solvents, DoC/PC co-solvent gives the lowest impedance, probably because of the higher PC content.

When the solvent is HeC/PC=4 shown in FIG. 10, most of the solvents in the solvated Li$^+$ are HeC because of the large ratio of HeC in the electrolyte, the bulky solvent molecule makes it difficult to co-intercalate into the graphene layers. Because of the deficiency of electrons on the graphite surface compared to inside the graphene layers, most PC molecules decompose via single-electron reduction mechanism. As shown in FIG. 10, two PC molecules consume two LPDC, which shows up at almost 100 cm$^{-1}$ higher in the cyclic carbonate structure. The vibration mode at 1100 cm$^{-1}$ is assigned to the C(2)O(4)C(5) asymmetric stretching mode. The peak at ~1300 cm$^{-1}$ is attributed to the CH$_2$ wagging mode in LPDC. A detailed assignment of all the signals in LPDC can be found in literature. The extra broad signal between 1350~1550 cm$^{-1}$ is probably from Li$_2$CO$_3$. Although most of PC go through single-electron decomposition because of the relative deficiency of electrons on graphite surface, some of the PC may still decompose via two-electron reduction mechanism, this explains the existence of Li$_2$CO$_3$ in the SEI. The signal between 1750~1850 cm$^{-1}$ in curve (c) is assigned to the cyclic carbonate in PC and HeC, once the solvent decompose to a linear structure in LPDC, this signal shifts to 1620~1720 cm$^{-1}$.

Current density is also an important fact that affects the exfoliation of graphite in PC. To further explore the influence of cycling rate on the graphite exfoliation behavior, we cycled half cells with HeC/PC=4 at different rates C/10 and C/100, the results are shown in FIG. 12. At 0.1 C, the solvated Li$^+$ does not have enough time for co-intercalation, solvent only decompose on the surface as shown in FIG. 10. However, when the cycling rate is slow (0.01 C), solvated Li$^+$ with bulky solvents has enough time to co-intercalate into the graphene layers, gaseous product from subsequent decomposition causes graphite exfoliation, as shown in Scheme 1. The rate dependence clearly supports the ideas behind the steric hindrance of co-intercalation.

FIGS. 13 to 15 illustrate a non-exclusive list of additional bi-functional additives that may be used in conjunction with anode electrodes such as carbon (including graphite), tin, silicon, and aluminum [Li—C, Li—Sn, Li—Si, Li—Al] and other anodes. In various embodiments of this invention, the ethylene carbonate (EC)-based additives have been shown as a very effective co-solvent for the use of propylene carbonate (PC) in graphite electrodes. In addition, we demonstrate that the use of vinylene carbonate (VC), methacrylate or acrylate-based additives could improve the cycling performance of high capacity-alloy anodes in lithium ion batteries.

Silicon is an attractive alternative to the state-of-the-art graphite anodes due to its high specific capacity (4200 mAh/g). However, a large volume expansion is associated with silicon during the cycling of silicon anodes, and an unstable solid electrolyte interphase (SEI) was attributed to the bad cycling performance. Vinylene carbonate pyrene (VCPy) is a promising additive, which has a bifunctional structure: the Vinylene carbonate (VC) structural moiety ensures the preferential decomposition of this additive before other electrolyte components; once electrochemically polymerized, the pyrene (Py) unit confers a graphene structure on the SEI of the silicon surface. This bifunctionality of the VCPy additive will contribute to a stable SEI on the silicon anode.

FIG. 16 illustrates the cycling performance of the silicon electrode using ethylene carbonate, diethyl carbonate with 1% VCPy. (a) capacity vs. cycle number, the cell was cycled at C/50 for 2 cycles and then C/10. (b) a first cycle voltage profile.

The cycling performance of Si-based cell was demonstrated in FIG. 16 using VCPy shown in FIG. 14. Although preliminary, this capacity value indicates a very promising electrochemical performance brought by the VCPy additive. The first cycle voltage curve shown in FIG. 16b exhibits a clear plateau that corresponds to a VC-type additive decomposition.

Lithium Salt

Another aspect of the present invention is that the mixture comprises a lithium salt. Any soluble lithium salt may be used in the present invention. In some embodiments, lithium salts having good ionic conductivity due to a low lattice energy (i.e. a high degree of dissociation), and high thermal stability and oxidation resistance may be used in the present invention. The lithium salts can be used alone or in selective mixture forms. Table 4 provides some lithium salts that are suitable for the electrolyte mixture of the present invention.

TABLE 4

Examples of Lithium Salts

| Salt | Formula |
|---|---|
| Lithium Hexafluorophoshate | $LiPF_6$ |
| Lithium Tetrafluoroborate | $LiBF_4$ |
| Lithium Hexaflouroarsenate | $LiAsF_6$ |
| Lithium Trifluoromethane Sulfonate | $LiCF_3SO_3$ |
| Lithium Iodide | $LiI$ |
| Lithium Bis(Trifluoromethanesulfonyl)Imide (LiTFSI) | $LiN(CF_3SO_2)_2$ |
| Lithium Bis(Perfluoroethylsulfonyl) Imide | $LiN(CF_3CF_2SO_2)_2$ |
| Lithium Perchlorate | $LiClO_4$ |
| Lithium Bis(Oxalato) Borate | $LiB(C_2O_4)_2$ |
| Tetraethylammonium Tetrafluoroborate | $(C_2H_5)_4NBF_4$ |
| Triethylmethylammonium Tetrafluoroborate | $(C_2H_5)_3CH_3NBF_4$ |

Lithium Battery

In an embodiment of the invention, a lithium battery is assembled, the battery including: (a) an electrolytic solution, wherein the electrolytic solution comprises at least one cyclic carbonate co-solvent and a propylene carbonate (PC) solvent, and a lithium salt; (b) a lithium metal negative electrode; and (c) a positive electrode. In another embodiment, the positive electrode can be $LiFePO_4$ (mixed with a carbon powder and a polymer binder), this material attractive for use as an electrode due to its low cost, non-toxicity, its thermal stability, and high specific capacity (170 mAh/g). Such $LiFePO_4$ cathodes are particularly well suited for use with the electrolytes of this invention. In addition to the above, the assembled batteries include a metal foil current collector to conduct current to and from the positive and negative electrodes.

CONCLUSIONS

A homologous series of cyclic carbonates or PC derivatives with increasing length of linear alkyl substitutes were synthesized and used as co-solvents in graphite lithium ion half cells. The synthesized cyclic carbonates with shorter linear alkyl chains (number of carbons≤3) decompose to gaseous products once co-intercalated into graphene layers, which induces exfoliation of graphite. However, cyclic carbonates with longer linear alkyl chains (number of carbons≥4) are able to prevent PC exfoliation when mixed with PC. Moreover, graphite half cells with bulky cyclic carbonate/PC co-solvents are able to cycle with a capacity of ~310 mAh/g and 99.95% efficiency. Embodiments of the invention show that PC co-intercalation is delayed by the competing solvation of bulky cyclic carbonates and subsequent single-electron reduction on the graphite surface forms a stable SEI, which allows the reversible cycling of graphite.

We claim:

1. An electrolyte mixture comprising:
   at least one co-solvent comprising (i) an ethylene carbonate substituted with a straight chain alkyl group comprising a poly(oxyethylene), or (ii) an ester substituted vinylene carbonate comprising the ester substituent that is partially fluorinated, fully fluorinated, or comprising an anthracene, pyrene, or poly(oxyethylene);
   a propylene carbonate (PC) solvent; and
   a lithium salt.

2. A lithium ion battery comprising:
   a positive electrode;
   a lithium negative electrode; and
   an electrolyte mixture comprising,
     at least one co-solvent comprising (i) an ethylene carbonate substituted with a straight chain alkyl group comprising a poly(oxyethylene), or (ii) an ester substituted vinylene carbonate comprising the ester substituent that is partially fluorinated, fully fluorinated, or comprising an anthracene, pyrene, or poly(oxyethylene);
     a propylene carbonate (PC) solvent; and
     a lithium salt.

3. The lithium ion battery of claim 2 wherein the lithium negative electrode is selected from the group comprising Li, $Li(C)_6$, Li—Al, Li—Sn and Li—Si.

4. The lithium ion battery of claim 2 wherein the lithium negative electrode comprises lithium metal.

5. The electrolyte mixture of claim 1, wherein the co-solvent comprises an ethylene carbonate substituted with a straight chain alkyl group comprising 3 to 10 carbon atoms.

6. The electrolyte mixture of claim 1, wherein the co-solvent comprises an ethylene carbonate substituted with a poly(oxyethylene).

7. The electrolyte mixture of claim 1, wherein the co-solvent comprises an alkyl substituted vinylene carbonate.

8. The electrolyte mixture of claim 1, wherein the co-solvent comprises the ester substituted vinylene carbonate comprising an ester substituent which is partially fluorinated, fully fluorinated, or comprising an anthracene, pyrene, or poly(oxyethylene).

9. The lithium ion battery of claim 2, wherein the co-solvent comprises an ethylene carbonate substituted with a straight chain alkyl group comprising 3 to 10 carbon atoms.

10. The lithium ion battery of claim 2, wherein the co-solvent comprises an ethylene carbonate substituted with a poly(oxyethylene).

11. The lithium ion battery of claim 2, wherein the co-solvent comprises an alkyl substituted vinylene carbonate.

12. The lithium ion battery of claim 2, wherein the co-solvent comprises the ester substituted vinylene carbonate comprising an ester substituent which is partially fluorinated, fully fluorinated, or comprising an anthracene, pyrene, or poly(oxyethylene).

\* \* \* \* \*